(12) United States Patent
Tseng

(10) Patent No.: US 7,637,395 B2
(45) Date of Patent: Dec. 29, 2009

(54) PUMP WITH A PRESSURE DRIVING HEAD

(75) Inventor: Sen-Li Tseng, Taipei (TW)

(73) Assignee: Hsih Tung Tolling Co., Ltd., Taichugn (TW)

( * ) Notice: Subject to any disclaimer, the term of this patent is extended or adjusted under 35 U.S.C. 154(b) by 508 days.

(21) Appl. No.: 11/507,273

(22) Filed: Aug. 22, 2006

(65) Prior Publication Data

US 2008/0047981 A1 Feb. 28, 2008

(51) Int. Cl.
*G01F 11/00* (2006.01)
(52) U.S. Cl. .................................................. 222/321.9
(58) Field of Classification Search ..... 22/321.1–321.9, 22/341
See application file for complete search history.

(56) References Cited

U.S. PATENT DOCUMENTS

| | | | | |
|---|---|---|---|---|
| 4,089,442 A | * | 5/1978 | Hafele et al. | 222/321.2 |
| 4,693,675 A | * | 9/1987 | Venus, Jr. | 417/489 |
| 5,176,296 A | * | 1/1993 | Lina et al. | 222/321.2 |
| 5,823,394 A | * | 10/1998 | Davis et al. | 222/137 |
| 2004/0099694 A1 | * | 5/2004 | Suzuki | 222/321.9 |

* cited by examiner

*Primary Examiner*—Kevin P Shaver
*Assistant Examiner*—Daniel R Shearer

(57) ABSTRACT

A pump with a pressure driving head comprises a retaining tube; the retaining tube having a receiving space; liquid can flow therein; a returning element being installed in the receiving space; a movable tube received in the receiving space of the retaining tube; a head extending from a top of the movable tube; the head having an outlet which is communicated to the movable tube; when a pressure is applied to the head, the movable tube will move axially in the retaining tube; and an isolation device tightly adhered upon an inner wall of the receiving space of the retaining tube; an air isolation chamber being formed by the isolation device and the movable tube; with the pressing affect of the movable tube, a part of liquid in the retaining tube will be stored in the air isolation chamber so as to be formed with an air isolation layer.

7 Claims, 6 Drawing Sheets

PUMP WITH A PRESSURE DRIVING HEAD

FIELD OF THE INVENTION

The present invention relates to a pump with a pressure driving head.

BACKGROUND OF THE INVENTION

Generally, a cleaning agent bottle has a pressable head at a top of the bottle for discharging liquid from the container. Thus it is unnecessary to open or close a cover in use and the user can obtain the cleaning agent by pressing the head.

In one prior art device, a pressable head is assembled in an opening of a container. An inner tube of the pressable head can be driven downwardly by pressing of the head. At the bottom of the inner tube, there is a plug and an elastic element. When the inner tube is pressed, the liquid in the container will be sucked out from the container. When the head is released, the head will return to it's original position by the resilient force of the elastic element so as to suck the liquid in the container repeatedly.

However, although the prior art structure has the effect of sucking liquid in the container, when the material in the container is not a clear liquid, such as one containing particles or emulsion, they will create wear of the inner wall of the retaining tube. As a result, gaps are formed and thus the pumping effect obtained by pressing the head is reduced. As a whole, the prior art structure is not a prefect one and needs to be improved.

SUMMARY OF THE INVENTION

Accordingly, the primary object of the present invention is to provide a pump with a pressure driving head, wherein the defects about the wearing and air ventilation of the inner wall by particle or emulsion like materials are improved.

To achieve above objects, the present invention provides a pump with a pressure driving head which comprises a retaining tube having two open ends; the retaining tube having a receiving space which a liquid can flow into and a returning element being installed in; the receiving space; a movable tube received in the receiving space of the retaining tube; a head extending from a top of the movable tube; the head having an outlet that communicates with the movable tube; when a pressure is applied to the head, the movable tube will move axially in the retaining tube; an isolation device is tightly engaged with an inner wall of the receiving space of the retaining tube; an air isolation chamber being formed by the isolation device and the movable tube; when the movable tube is pressed, a part of the liquid in the retaining tube will remain in the air isolation chamber so as to be formed with an air isolation layer.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
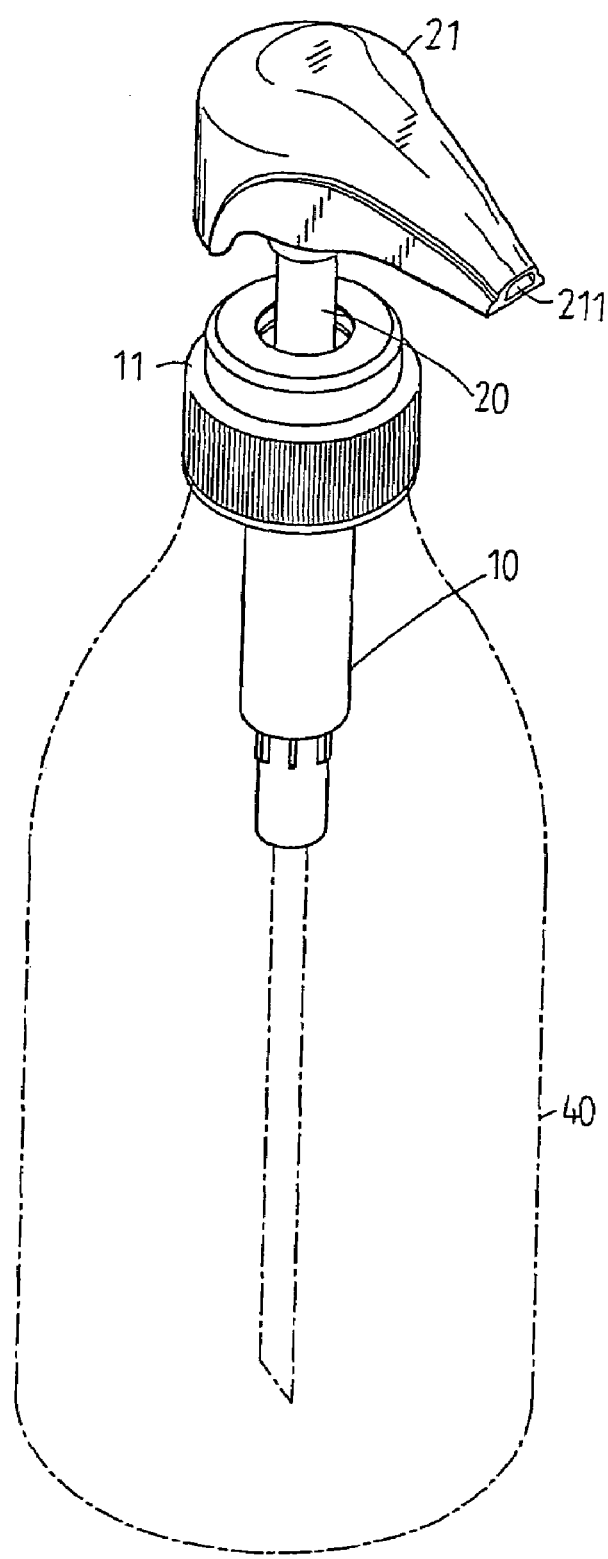
FIG. 1 is a schematic perspective view showing a pump with a pressure driving head of the present invention.
Figure 2:
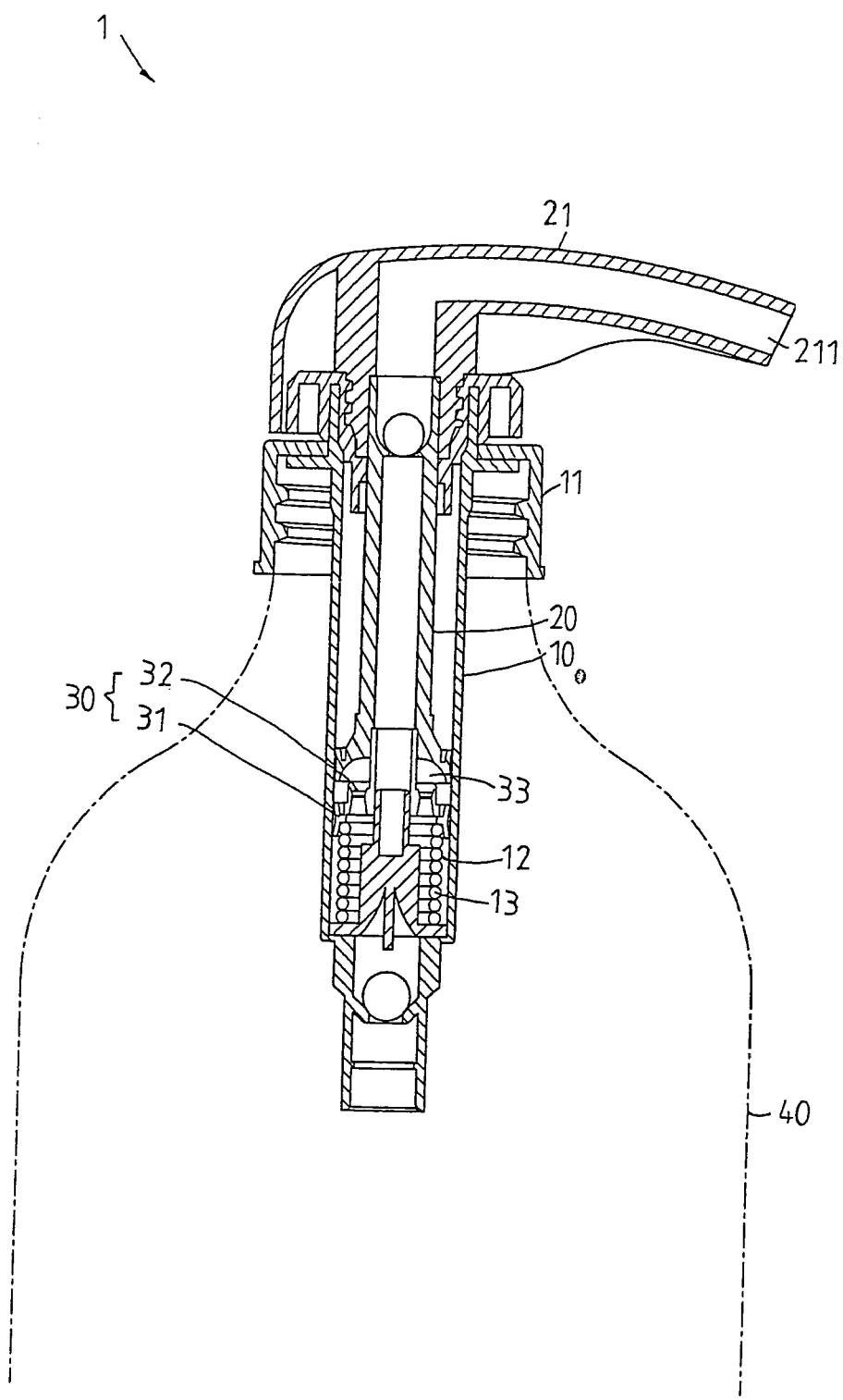
FIG. 2 is a schematic cross-sectional view of the pump with a pressure driving head of the present invention.
Figures 3, 4:
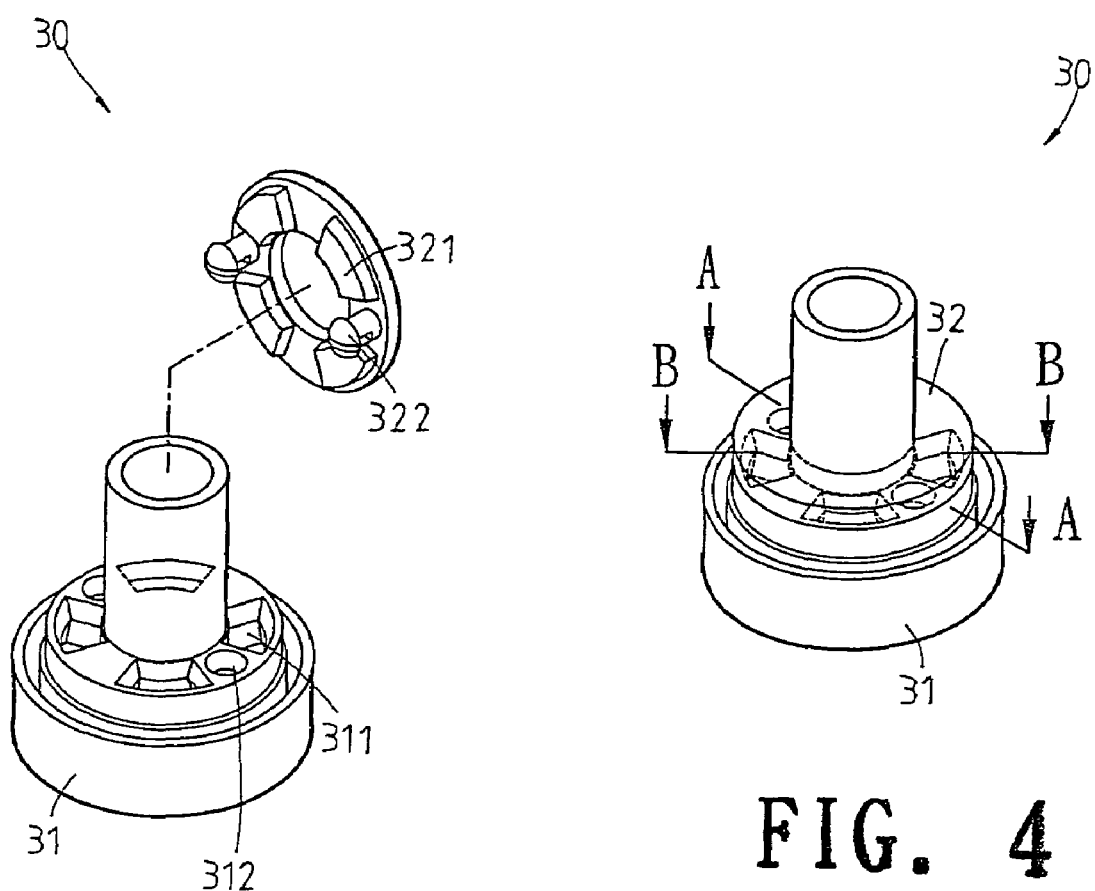
FIG. 3 is an exploded perspective view showing the air isolation structure of the pump with a pressure driving head of the present invention.
FIG. 4 is a perspective view showing the air isolation structure of the pump with a pressure driving head of the present invention.
Figure 7:
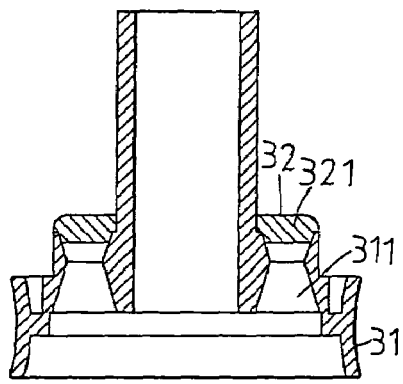
FIG. 7 is a schematic cross-sectional view along line B-B of FIG. 4.
Figure 8:
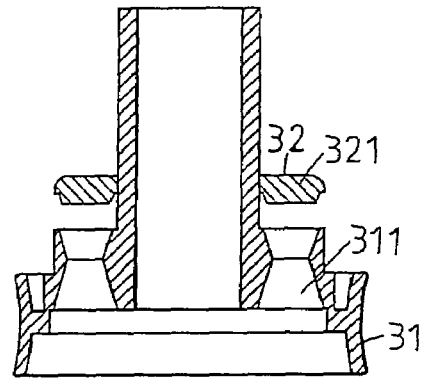
FIG. 8 is a schematic cross-sectional view showing the check valve in FIG. 7 being opened.
Figure 5:
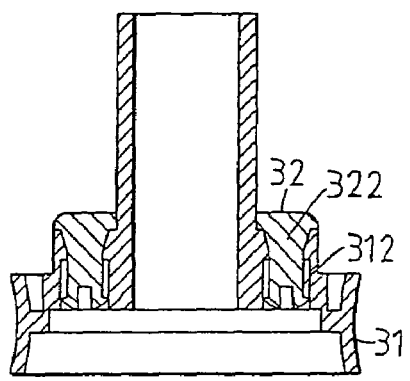
FIG. 5 is a schematic cross-sectional view along line A-A of FIG. 4.
Figure 6:
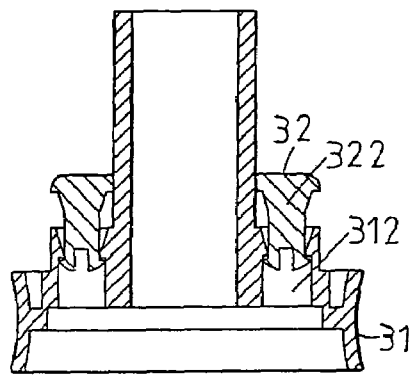
FIG. 6 is a schematic cross-sectional view showing how the check valve is opened according to the FIG. 5.

Referring to FIGS. 1 and 2, the pump of the present invention is illustrated. The body 1 of the present invention includes a retaining tube 10, a movable tube 20 and an isolation device 30. The movable tube 20 is reciprocal within retaining tube 10 for changing the pressure in the retaining tube 20 and isolation device 30 is mounted at the lower end of the movable tube 20. When the user presses the top of the movable tube 20, the movable tube 20 moves downwardly within the retaining tube 10 so as to drain the liquid/air in the movable tube 20 and, when the top of the movable tube 20 is released, the movable tube 20 moves upwardly with the isolation device 30 to reduce the pressure of the fluid in the retaining tube 10 so as to suck the liquid from a container 40. The structure is known in the prior art and thus the details will not be further described herein.

The retaining tube 10 has an open lower end and an open upper end. A cover 11 encloses the upper end of the retaining tube 10 and the lower end of the retaining tube 20 is selectively closed by a steel ball (not numbered). The cover 11 fits over an opening of a container 40. Liquid is contained in the container 40. The retaining tube 10 has a receiving space 12. The liquid in the container 40 can flow into the receiving space 12 when the pressure in the receiving space is less than atmospheric pressure. A returning element 13 is installed in the receiving space 12. In this embodiment, the returning element 13 is a spring that acts between the lower end of the retaining tube 20 and the isolation device 30.

The movable tube 20 is received in the receiving space 12 of the retaining tube 10. A head 21 is extended from one side of the top of the movable tube 20. The head 21 has an outlet 211 which is communicated with the movable tube 20. When a user presses the head 21, the movable tube 20 will move axially downwardly within the retaining tube 10. When the user releases the head 21, the movable tube 20 will be urged upwardly by the elastic force of the returning element 13 to return to it's original position.

Referring to FIGS. 3 to 8, the isolation device 30 includes a piston sheet 31 and a check valve 32. The piston sheet 31 of the isolation device 30 is tightly slidingly engaged with an inner wall of the receiving space 12 of the retaining tube 10 so as to be combined with the lower end of the movable tube 20. An air isolation chamber 33 is formed by the piston sheet 31 of the isolation device 30 and the movable tube 20. The piston sheet 31 has at least one through hole 311 and a positioning hole 312. The through hole 311 is communicated to the air isolation chamber 33. Two ends of the through hole 311 have larger diameters than that of the middle portion thereof. The check valve 32 is positioned by means of the positioning hole 312. The check valve 32 includes an inclined plug 321 having a shape corresponding to the shape of the through hole 311 and a positioning rod 322 having a shape corresponding to that of the positioning hole 312. The plug 321 of the check valve 32 provides a unidirectional isolation function for the air isolation chamber 33. Thus liquid can move into the air isolation chamber 33 and be stored in the air isolation chamber 33 so as to form an air-tight layer. The configuration of the through hole 311 has the function of providing the liquid to flow into the isolation chamber 33 so as to form a layer for isolating air. The positioning rod 322 can be inserted into the positioning hole 312 so that the check valve 32 opens and closes along a predetermined path. The configurations of the through hole 311 and plug 321 are not confined to those disclosed in FIGS. 3 and 4. Other configurations are also permissible.

Figure 9:
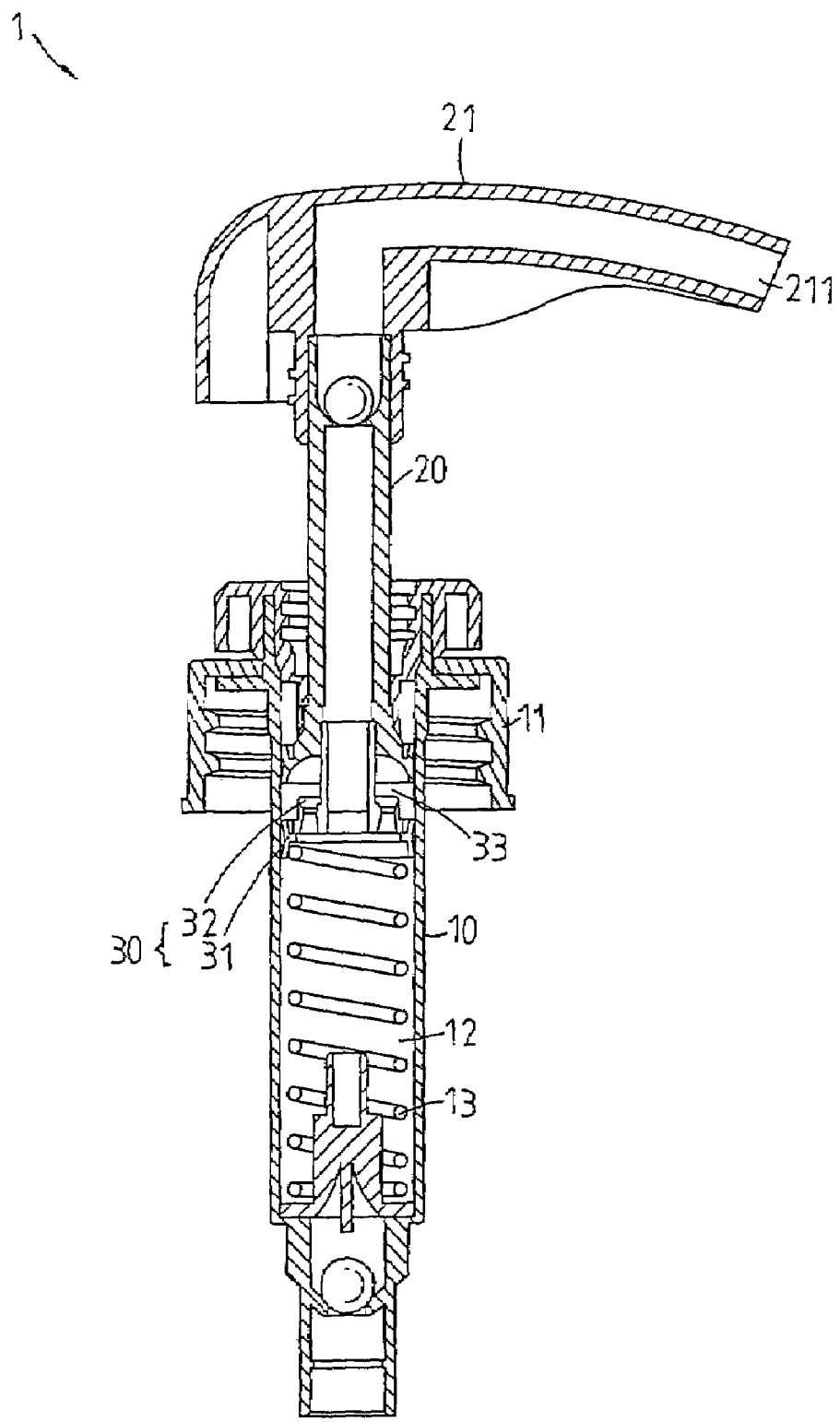
FIG. 9 is a schematic cross-sectional view showing the use of the pump with a pressure driving head of the present invention.
Figure 10:
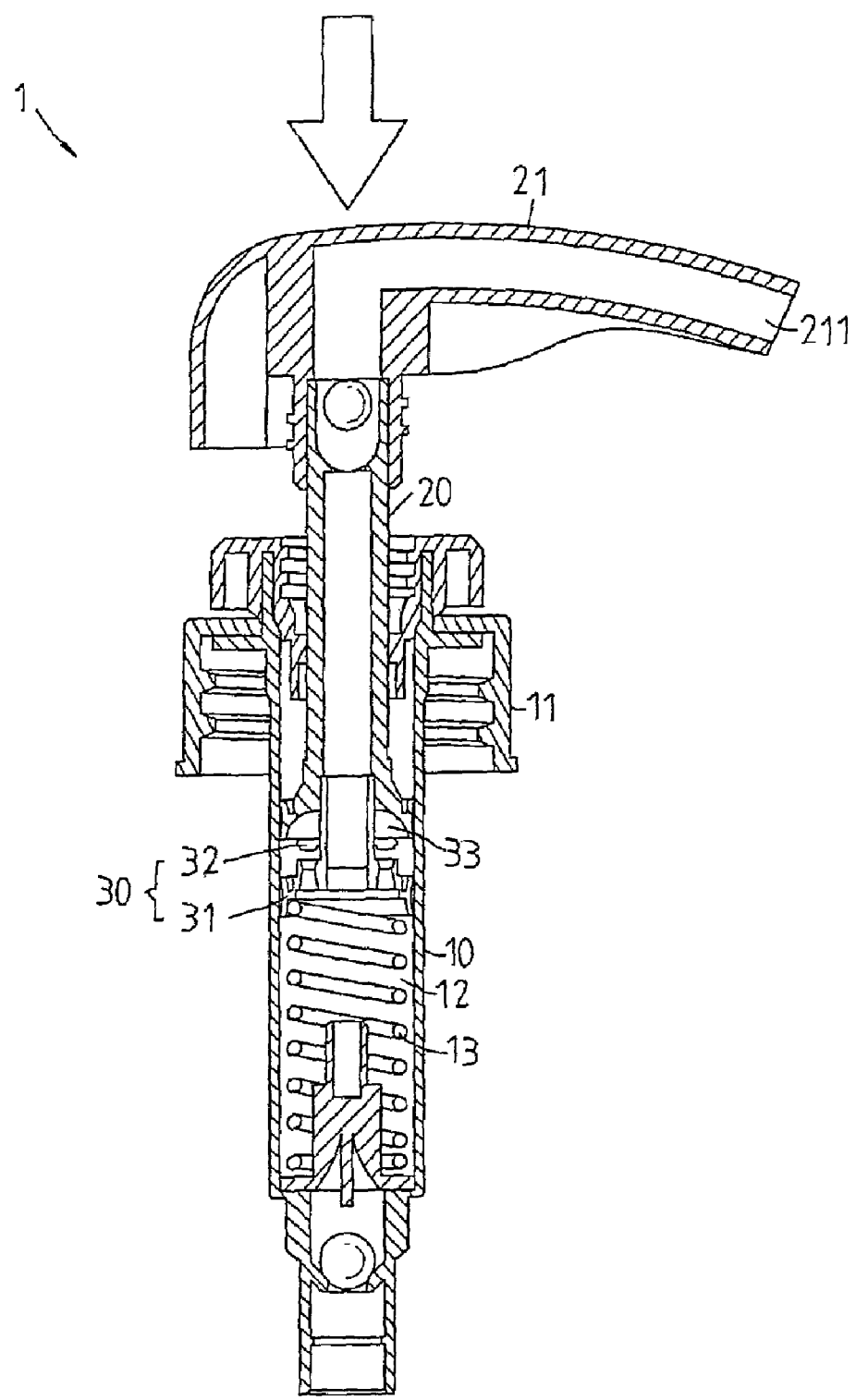
FIG. 10 is a schematic view showing the check valve of the pump with a pressure driving head of the present invention being opened.

Referring to FIGS. 9 and 10, when the user presses the head 21, the liquid therein will be extruded upwardly and then the plug 321 sealing the through hole 311 will also move upwardly so that the through hole 311 is opened. Thus, the liquid in the receiving space 12 drains out of the outlet 211 by passing through the isolation device 30, the movable tube 30, and the head 21. A portion of the liquid flows into the air isolation chamber 33 from the through hole 311. The portion of the liquid received in the isolation chamber 33 is replaced due to an extruded pressure of the liquid when the user presses the head 21 every time. The check valve 32 closes the through hole 311 and the positioning hole 312 in the piston sheet 31 when the suction pressure disappears so that the portion of the liquid is stored in the air isolation chamber 33 as an airtight isolation layer for sealing a space between an upper part of the piston 31 and an inner periphery of the retaining tube 10. The isolation device 30 divides the receiving space 12 of the retaining tube 10 into two portions. Thus, when drawing the liquid from the container 40 into the receiving space 12, the liquid in the air isolation chamber 33 can flow into the gap at the inner wall of the movable tube 20 so as to have the function of sliding the movable tube 20 to move reciprocally. Thus, the liquid in the container 40 can be sucked completely by means of the movable tube 20.

When the portion of the liquid in the air isolation chamber 33 is formed as an isolation layer and the movable tube 20 is reciprocated, the movable tube 20 will suck the liquid in the container 40. The liquid flows from the bottom of the receiving space 12 to the movable tube 20 and then is released from the outlet 211 of the head 21. Thus the air isolation layer has the effect of preventing the release of air. Therefore, the liquid released during the process of pressing the head 21 is released.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A pump with a pressure driving head, comprising;
    a retaining tube having two open ends, the retaining tube having a receiving space which a liquid can flow into, a returning element being installed in the receiving space;
    a movable tube received in the receiving space of the retaining tube, a head extending from a top of the movable tube, the head having an outlet communicated with the movable tube; wherein when a pressure is applied to the head, the movable tube will move axially relative to the retaining tube; and
    an isolation device tightly slidingly engaged with an inner wall of the receiving space of the retaining tube; an air isolation chamber being formed by the isolation device and the movable tube, wherein when the movable tube is pressed, a part of the liquid in the retaining tube will remain in the air isolation chamber;
    wherein a negative pressure is formed in the retaining tube to suck liquid from a container when the movable tube and the isolation device are moved upwardly in the retaining tube, the sucked liquid flowing into and filling the air isolation chamber to form an isolation layer and filling a gap between the isolation device and an inner wall of the retaining tube when the movable tube and the isolation device are moved relative to the retaining tube.

2. The pump with a pressure driving head as claimed in claim 1, wherein the isolation device comprises a piston sheet and a check valve.

3. The pump with a pressure driving head as claimed in claim 2, wherein the piston sheet has a through hole that communicates with the air isolation chamber, the check valve including a plug extending therefrom and having a shape corresponding to that of the through hole in the piston sheet, the plug received in the through hole in the piston sheet for selectively engaging the through hole in the piston sheet.

4. The pump with a pressure driving head as claimed in claim 3, wherein the piston sheet is formed with a positioning hole and the check valve includes a positioning rod engaging in the positioning hole.

5. The pump with a pressure driving head as claimed in claim 4, wherein the two ends of the through hole in the piston sheet have larger diameters than that of the middle portion thereof.

6. The pump with a pressure driving head as claimed in claim 1, wherein the returning element within the receiving space of the retaining tube is a spring.

7. The pump with a pressure driving head as claimed in claim 1 further comprising a cover attached to the periphery of the retaining tube.

* * * * *